(12) United States Patent
Martinez Heras et al.

(10) Patent No.: US 9,317,483 B2
(45) Date of Patent: Apr. 19, 2016

(54) METHOD AND TELEMETRIC DEVICE FOR RESAMPLING TIME SERIES DATA

(75) Inventors: José Antonio Martinez Heras, Darmstadt (DE); Tiago Filipe Ferreira Francisco, Darmstadt (DE); Alessandro Donati, Darmstadt (DE)

(73) Assignee: European Space Agency, Paris (FR)

( * ) Notice: Subject to any disclaimer, the term of this patent is extended or adjusted under 35 U.S.C. 154(b) by 513 days.

(21) Appl. No.: 13/811,659

(22) PCT Filed: Jul. 20, 2011

(86) PCT No.: PCT/EP2011/062475
§ 371 (c)(1),
(2), (4) Date: May 2, 2013

(87) PCT Pub. No.: WO2012/010642
PCT Pub. Date: Jan. 26, 2012

(65) Prior Publication Data
US 2013/0212142 A1 Aug. 15, 2013

(30) Foreign Application Priority Data
Jul. 20, 2010 (EP) .................................... 10170196

(51) Int. Cl.
*G06F 7/38* (2006.01)
*G06F 17/17* (2006.01)

(52) U.S. Cl.
CPC ....................................... *G06F 17/17* (2013.01)

(58) Field of Classification Search
CPC ....................................................... G06F 17/17
USPC ....................................................... 708/290
See application file for complete search history.

(56) References Cited

U.S. PATENT DOCUMENTS

2003/0025712 A1* 2/2003 Corr .............................. 345/606

OTHER PUBLICATIONS

Dash, S., et al. "A Novel Interval-Halving Framework for Automated Identification of Process Trends," New York, Jan. 2004, AIChE Journal 50(1):149-162.
European Search Report mailed Jun. 30, 2011, in European Patent Application No. 10170196.9 filed Jul. 20, 2010, 2 pages.
International Search Report mailed Apr. 19, 2012, in International Patent Application No. PCT/EP2011/062475 filed Jul. 20, 2011, 2 pages.

(Continued)

*Primary Examiner* — Tan V. Mai
(74) *Attorney, Agent, or Firm* — Christensen O'Connor Johnson Kindness PLLC (57) ABSTRACT

A method for resampling time series data includes determining a first time series of data points; determining a variation of the data points within a selected sequence, wherein the variation is determined by determining linearly interpolated data points for the data points of the selected sequence and by determining a maximum absolute difference. If a determined variation is greater than a predetermined error value, subsequences are selected by repeatedly dividing the first time series into adjacent subsequences until the first time series comprises a set of subsequences, wherein a determined variation for each of the subsequences is smaller than the predetermined error value. A resampled time series is created by adding the data points of the first time series that correspond to a first or last data point of the selected subsequences to the resampled time series, wherein every data point is added only once to the resampled time series.

14 Claims, 11 Drawing Sheets

(56) References Cited

OTHER PUBLICATIONS

Keogh, E., et al., "An Online Algorithm for Segmenting Time Series," Data Mining, 2001. Proceedings of the 2001 IEEE International Conference on Data Mining (ICDM), Nov. 29-Dec. 2, 2001, San Jose, Calif., pp. 289-296.

Lin, J., et al., "Visually Mining and Monitoring Massive Time Series," Proceedings of the 10th ACM SIGKDD International Conference on Knowledge Discovery and Data Mining, Aug. 22-25, 2004, Seattle, Wash., pp. 460-469.

Shneiderman, B., "The Eyes Have It: A Task by Data Type Taxonomy for Information Visualizations," XP002943734, Proceedings of the IEEE Symposium on Visual Language, Nov. 1, 1996, pp. 336-343.

European Search Report dated Aug. 21, 2012, in European Patent Application No. 10170196.9 filed Jul. 20, 2010, 10 pages.

* cited by examiner

METHOD AND TELEMETRIC DEVICE FOR RESAMPLING TIME SERIES DATA

BACKGROUND

The present disclosure relates to a method for resampling time series data and to a telemetric device configured to resample measured time series data.

SUMMARY

A particular, but non-exhaustive, application of the present disclosure lies in space missions where on-board technical devices of remote systems (e.g., spacecraft, rovers) need to be monitored remotely at high precision by measuring a plurality of technical parameters in the form of telemetric time series data. The measured time series data are usually downlinked to ground stations for further analysis. Such housekeeping telemetry parameters are sampled at regular intervals, typically at the associated packet rate from the spacecraft data pool and inserted into a downlink packet. Sampling and downlinking time series data at high frequency is a prerequisite for capturing and monitoring short-lived events and for obtaining high-fidelity data. However, the monitoring accuracy is usually limited by the bandwidth available to downlink the data, which thereby also limits the maximum sampling rate.

A proposed solution in the prior art is to compensate for the limited bandwidth by means of compression techniques, wherein the measured telemetric data is encoded before being downlinked through the use of specific encoding schemes using fewer information-bearing units than an unencoded representation would use. Thus, the receiver of the transmitted compressed data needs to understand the encoding scheme and to be able to decode or decompress the received data. In particular, lossless compression techniques (e.g., zip or RICE) are used instead of lossy compression techniques due to concerns about risks of losing precision. However, the achievable compression rates of lossless compression techniques limit the possible sampling rate. Moreover, such compression techniques consume valuable CPU power which is often a limited resource at remote systems, in particular, on-board a space exploration vehicle.

In view of the above problems of the prior art, the present disclosure seeks to enable the observability of remote systems at higher fidelity and reduced bandwidth. It is a further object of the present disclosure to provide a telemetric device capable of transmitting measured time series data using less bandwidth and consuming less CPU power.

A method for processing time series data is proposed so that the processed time series data can be more efficiently transmitted using less bandwidth or can be more efficiently stored using less storage space. In particular, a method for resampling time series data is proposed. The term "resampling" as used in this disclosure refers to the fact the proposed method selects certain sample data points out of an original data sample in order to reduce the overall data volume, and thus, is able to transmit a reduced data set, i.e., the selected data points, in the same data format as the original time series in contrast to compression methods that have to encode the underlying data samples. Preferably, the time series data are telemetric time series data or telemetric parameters. By way of example, the measured time series data are telemetric housekeeping parameters used to monitor remotely the operation of a remote device. According to an aspect of the present disclosure, the method for resampling time series data comprises the step of determining a first time series that comprises a sequence of data points. By way of example, a first time series might be determined by measuring time series data or by retrieving an initial sequence of previously measured time series data from a storage device.

A time series or time series data in the context of this disclosure is a sequence of data points or parameter values measured typically at successive times spaced at uniform time intervals. This sequence of data points or parameter values is therefore a sequence of time-parameter data pairs having a natural temporal ordering. It is not necessarily required that the specific time is always provided or stored together with the corresponding parameter pair, as long as the natural temporal ordering can be reconstructed, which is, for example, the case if the parameter values are measured at regular time intervals and stored in their temporal ordering.

If data samples are not provided at regular intervals, the parameter data should be registered in [time, value]-pairs.

According to another aspect of the present disclosure, the method comprises the step of determining a variation of the data points within a selected sequence of data points. This variation is determined by linearly interpolating the selected sequence of data points, i.e., by determining a linearly interpolated data point value for every data point of the selected sequence of data points. Then, the absolute difference between the data point value and the corresponding interpolated data point value is determined for each data point of the selected sequence. The maximum of the absolute differences is set as the determined variation of the data points within the selected sequence of data points. In other words, it is proposed to generate a temporary second time series data sequence by assuming a linear interpolation between the start and end data samples of the selected sequence of time-parameter pairs, which results in a corresponding linearly-interpolated value for every parameter value of the selected sequence. The variation of the data points of the selected sequence is then determined by determining the largest absolute error between the actual parameter value and the corresponding linearly-interpolated parameter value within the selected sequence.

The above maximum absolute difference as the variation within a selected sequence of data points can be determined for any selected sequence of time-parameter data pair. A selected sequence is typically defined by its start and end point, i.e., the first and last time-parameter data pair of the selected sequence.

According to another aspect of the present disclosure, this variation is first determined for the first time series as the initial sequence of time-parameter pairs. If the determined variation for the first time series is greater than a predetermined error value, then the method further proposes to select subsequences of the first sequence by repeatedly dividing the first time series into adjacent subsequences until the first time series comprises a set of subsequences, wherein a determined variation for each of the subsequences is smaller than the predetermined error value. Subsequences are adjacent if they share a common data point as the first sample of one subsequence and the last sample of the other subsequence.

Thus, if the variation within the first time series is above the error threshold, the first time series is divided into a plurality of subsequences and the variation is determined again for each of the subsequences. The subsequences for which the determined variation is above the error threshold are again divided into further subsequences and the variation is determined again for each of these further subsequences, and so forth. These processing steps therefore divide the first time series repeatedly into a number of subsequences, typically comprising a varying number of data points, until the resulting final subsequences are within a predetermined error threshold.

By way of example, the predetermined error value as the error threshold may be a typical error threshold for the observed system, wherein fluctuations within the error threshold correspond to background noise and/or fluctuations that do not indicate a particular event or abnormality, and, thus, are not required for further analysis.

According to another aspect of the present disclosure, a resampled time series is created by adding the data points of the first time series that correspond to a first or last data point of the selected subsequences, wherein every data point is added only once to the resampled time series. Preferably, once a sequence has been selected, the first and last data points of the selected sequence are added to the resampled time series. If the determined variation of this sequence is still above the predetermined error value, then the start or end points of the further created subsequences are successively added to the resampled time series, as long as no data point is added more than once. Thus, the resampled time series contains selected data samples of the first time series, and, therefore, represents resampled time series data of the first time series data. According to a further aspect, the method may further comprise the step of outputting or transmitting the resampled time series. Preferably, the resampled time series is transmitted to a remote receiver.

In contrast to the lossless compressing approaches known from the prior art, the present disclosure uses a lossy resampling approach to process time series data so that it can be transmitted using less bandwidth or can be stored requiring less storage space. The number of data samples in the resampled time series are reduced in comparison to the initial time series, wherein the predetermined error value is influencing the resulting "compression ratio." However, it is a particular advantage that the current disclosure does not use a "compressing" approach (encoding the initial time series into a different, more compact data format) to process the time series data, but, instead, uses a resampling approach. As a consequence, the processed resampled time series data can be stored or transmitted in the same format as the original time series data avoiding the resource-consuming encoding or decoding of prior art compression techniques. Even though a lossy processing approach is used, it is a further advantage that the present disclosure provides high-fidelity time series data by guaranteeing a maximum error which is the predetermined error threshold for a given resampled data sequence.

The linear interpolation technique applied to increasingly smaller subsequences used in combination with the determined variations of the data points within these subsequences enable a fast and effective, yet resource-efficient reduction of time series data at high fidelity: The proposed method efficiently identifies and removes time series data samples that are within the normal measurement error or correspond to normal fluctuations or background noise only, whereas data samples that correspond to relevant events or abnormalities of the observed device are represented in the resampled time series at high resolution. As a result, the lossy resampling approach of the present disclosure enables monitoring of short-term events at very high sampling rates, since it requires less bandwidth than lossless prior art compression techniques used to compress time series data.

According to a further aspect of the present disclosure, a sequence of data points may be divided into smaller subsequences by substantially evenly dividing the sequence in half, wherein the last time-parameter data pair of the first half corresponds to the first time-parameter data pair of the second half. For example, a sequence with n data points is divided into a first half comprising the data points [1, 2, 3, ..., n/2] and into a second half comprising the data points [n/2, n/2+1, ..., n]. The term "substantially" in this context refers to the fact that exactly dividing the sequence in half is not possible when the concerned data sequence consists of an even number of data points. In this case, n/2 does not determine a valid data point, since a midpoint does not exist. In that case, a data point left or right to the middle of the data sequence may be selected, e.g., (n−1)/2 or (n−1)/2, as the data point that represents the end point of the first subsequence as well as the start point of the second subsequence. Repeatedly dividing the sequence substantially in half is particularly fast and efficient compared to other possible approaches when dividing the first time series data sequence successively into smaller subsequences.

According to a further aspect of the present disclosure, the method may further comprise the step of selecting a predetermined limit for the number of data points of the resampled time series. After the predetermined limit of data points has been added to the resampled time series, the method may stop the step of selecting subsequences so that no further data points are added to the resampled time series. In this case, at the time when the resampling is stopped, the first time series may comprise a number of subsequences, in which the determined variations are still above the predetermined error value. According to a further aspect of the present disclosure, the determined variations of these subsequences may be outputted together with the resampled time series to provide a confidence measure with respect to the outputted resampled time series. Alternatively, only the maximum variation can be outputted. According to this embodiment, the resulting resampled time series can be very accurately adjusted to the available bandwidth and, at the same time, an accurate confidence measure can be provided based on the determined variations. For example, the number of data samples of the transmitted resampled time series can be set high, if sufficient bandwidth is available, and set low, if bandwidth is limited.

According to a further aspect of the present disclosure, at least a part of the first time series may be stored in a buffer, while the step of selecting subsequences is conducted, in particular, if the resampling of time series data is used in real-time applications.

According to a further aspect, a telemetry parameter "thumbnail" approach may be used, wherein a first resampled time series is outputted using a first predetermined error value. A high value for the first predetermined error value may be used so that the outputted resampled time series represents a preview of the time series data sequence including all the events, peaks, etc. above the first error threshold, while at the same time comprising very few data points to reduce the required bandwidth (similar to a thumbnail as a reduced-size version of picture). Alternatively, a plurality of first time series that have been resampled using a first predetermined error value may be outputted.

It is then possible to define the most interesting time series data, e.g., by identifying the parameter that shows unusual patterns in its time series data, e.g., by engineers at a remote location. It is further possible to identify parts or subsequences within a particular first resampled time series that may indicate a malfunction of the remote device. In response to the received first time series or plurality of first time series, the entire time series or relevant subsequences thereof can be requested from the telemetric device for further analysis by transmitting a selection value to the telemetric device. Upon receipt of the selection value, the telemetric device can conduct a second resampling using a lower error threshold only for the time series data that have been specified by the received selection value. This allows for a particular efficient use of bandwidth in case a large number of parameters are monitored remotely as only those time series data are requested at high resolution using a second error threshold in which the resampled first time series data have already indicated a need for further analysis. Preferably, the second predetermined error value is smaller than the first predetermined error value. By way of example, if the second predetermined error value is set to zero, then all the data points of the time series sequence determined by the selection value are outputted.

A further aspect of the present disclosure relates to a telemetric device for measuring time series data. The telemetric device may comprise a sensor configured to measure a first time series comprising a sequence of data points. The telemetric device further comprises a processing unit, the processing unit being configured to determine a variation of the parameter value within a selected sequence of data points, and wherein the variation is determined by linearly interpolating the selected sequence of the data points and by determining the maximum absolute difference between the parameter value and the corresponding interpolated parameter value within the selected sequence.

According to a further aspect of the present disclosure, if a determined variation of the first time series is created in a predetermined error value, said processing unit is further configured to select subsequences by repeatedly dividing the first time series into adjacent subsequences until the first time series comprises a set of subsequences, wherein the determined variation for each of the subsequences is smaller than a predetermined error value, and wherein said processing unit is further configured to create a resampled time series by adding the data points of the first time series that corresponds to a first or last data point of sequence or a subsequence of which the determined variation is smaller than the predetermined error value to the resampled time series. According to a further aspect, the telemetric device may further comprise a sender unit for outputting the resampled time series.

Moreover, it is proposed that said processing unit may be configured to measure a time series for a plurality of parameters and to output a resampled time series for a plurality of parameters, wherein a separate value for the predetermined error can be selected for every parameter. This allows adapting the maximum error individually to the specific background noise or event characteristic of every telemetry parameter. The telemetric device may further comprise a buffer unit, wherein at least a part of the first time series is stored in the buffer unit, while the resampled time series is created. Buffering the measured time series data in a buffer unit is advantageous when time series data are resampled in real time instead of "offline" resampling at a later point in time.

It is proposed that the telemetric device may be operated in a first mode and a second mode, wherein the first mode corresponds to the above-described preview or "thumbnail" mode, in which a first resampled time series is outputted using a first predetermined error value. In the second mode, the telemetric device is configured to receive a selection value that determines a subsequence of the first time series and to create a second resampled time series for the received subsequence and using a second predetermined error value, wherein the second predetermined error value is smaller than the first predetermined error value. The selection value may also select a subset of parameters out of a plurality of parameters for which times series data have been resampled at a first error threshold. Based on the selected subset of parameters, the telemetric device may provide resampled time series data at a second lower error threshold for the selected parameters only.

According to a further aspect of the present disclosure, a device for resampling time series data, comprising a means for determining a first time series $10$ comprising a sequence of data points $P_i$; a means for determining a variation $V$ of the data points $P_i$ within a selected sequence of data points, wherein the variation is determined by determining linearly interpolated data points for the data points of the selected sequence and by determining a maximum absolute difference between the data point value $P_i$ and the corresponding interpolated data point value for the data points of the selected sequence. The device further comprises means for selecting subsequences by repeatedly dividing the first time series into adjacent subsequences until the first time series comprises a set of subsequences, wherein a determined variation for each of the subsequences is smaller than the predetermined error value if a determined variation of the data points within the first time series is greater than a predetermined error value; and a means for creating a resampled time series by adding the data points $P_i$ of the first time series that correspond to a first or last data point of the selected subsequences to the resampled time series, wherein every data point $P_i$ is added only once.

According to another aspect of the present disclosure, the telemetric device may be configured to output the resampled time series in the same format as the measured time series so that no reformatting or decoding is required.

The present disclosure is particularly suitable for use in a spacecraft or a space rover that is equipped with a telemetric device according to the present disclosure. However, it should be clear that the present disclosure is not restricted to space applications. The present disclosure finds applications in numerous other fields where bandwidth or storage space for time series data is limited. For example, a mobile device may comprise a telemetric device according to the present disclosure, which would reduce costly bandwidth requirements and transmission costs in telecommunication applications. Data storage devices that are configured to resample data according to the resampling method of the present disclosure can also greatly benefit from the present disclosure, since resampled time series data can be stored using less storage space.

The present disclosure provides a unique and new way of increasing the information content per unit of bandwidth and, therefore, can be applied in any industry that employs remote sensing as an element of its processes such as underwater vehicles, military or robotic devices, or telemetry applications in offshore industries. The major challenge in all these applications from a cost and technical perspective is to fit all the information that the remote user wishes to see into the available bandwidth. In addition to the reduced bandwidth requirements, it enables shorter or fewer passes, faster reaction times, and reduced storage needs on-board and on-ground.

It is a particular advantage of the present disclosure that it achieves a significant reduction of the number of samples while guaranteeing a given maximum error. The resampling method guarantees a maximum error anywhere in the time series, including anomalous sudden peaks. This approach is superior to the usual lossless compressing methods in the sense that the lossy resampled time series represents the original behavior usually with far fewer samples. A further advantage is that the resampled time series data are directly usable as they can be provided in the same format as the original time series avoiding the need for additional encoding and decoding procedures.

DESCRIPTION OF THE DRAWINGS

The present disclosure is explained below in an exemplary manner with reference to the accompanying drawings, wherein.

DETAILED DESCRIPTION

Figure 1A:
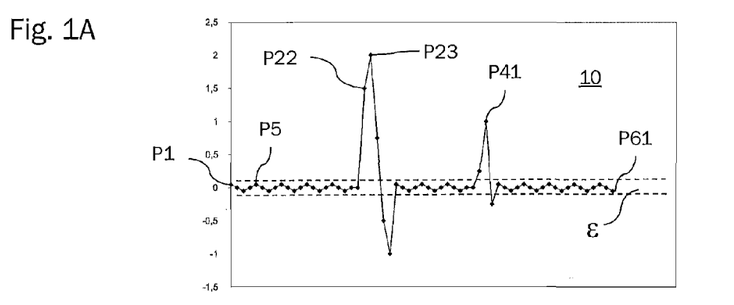
FIGS. 1A, 1B, and 1C illustrate schematically the effect of the resampling method of time series data according to an embodiment of the present disclosure.

FIG. 1A shows a simple example of an original time series 10 comprising a sequence of 61 measured data points P. A predetermined error threshold $\epsilon$ is set to be larger than the normal fluctuations of the measured data points P.

Figure 1B:
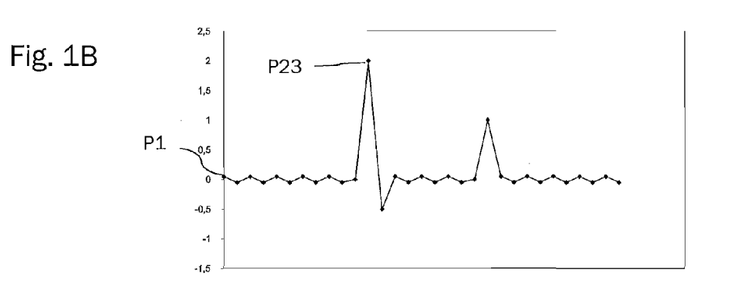
Figure 1C:
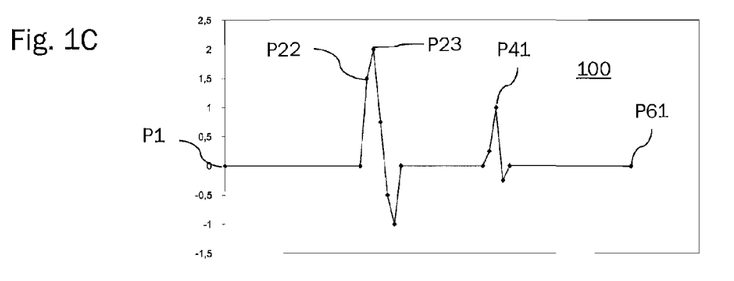

FIG. 1B illustrates the time series of FIG. 1 after it has been down-sampled to a time series comprising half the data samples of the original time series using a regular sampling approach wherein 1 data point out of two have been skipped. Down-sampling using this approach loses important technical information since the peaks indicating a technical problem are not sampled at a high resolution. By contrast, FIG. 1C, illustrates the effect of a resulting time series 100, if an irregular resampling method of the present disclosure using a 1% predetermined error threshold is applied to the original time series of FIG. 1A. The original time series shown in FIGURE 1A has been reduced to only 14 data points by removing the data points within the predetermined error of 1% (the predetermined error of 1% being defined as 1% of the difference between the maximum and minimum value of the measured time series data), e.g., the data samples describing background noise only, and by keeping the data points (e.g., P22, P23) that correspond to potential short-term events or abnormalities.

Thus, if the noise is smaller than the allowed error, the resampling method of the present disclosure allows for very efficient noise removal and represents the original behavior usually with a reduced set of data points of the original time series.

Figure 2:
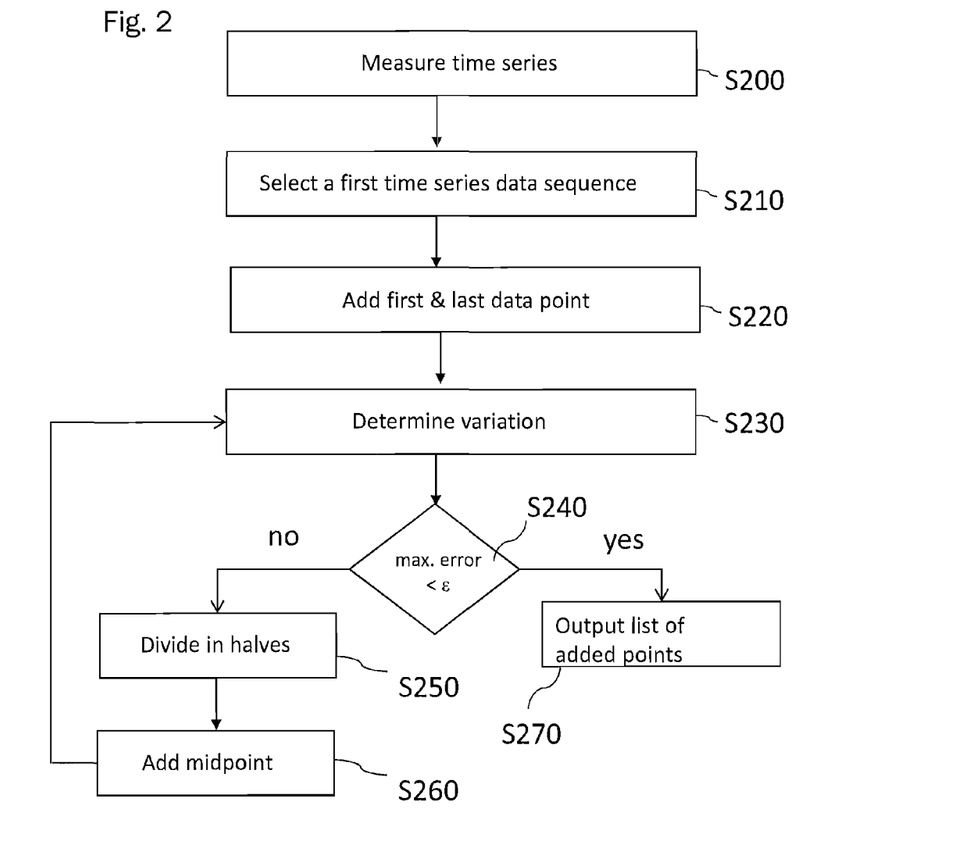
FIG. 2 shows a flow diagram that illustrates the main steps of the resampling method according to an embodiment of the present disclosure.
Figure 3:
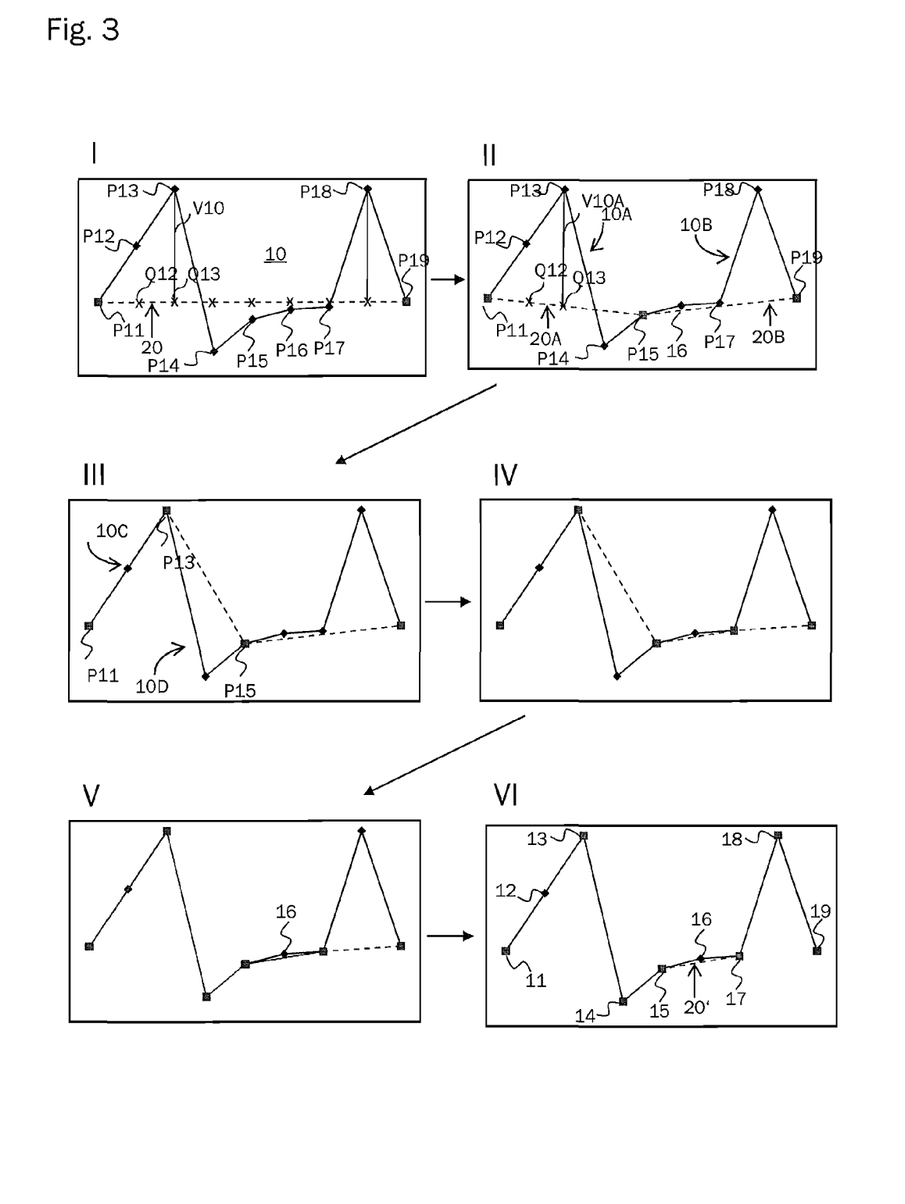
FIG. 3 illustrates exemplarily the resampling method for a very simple time series according to an embodiment of the present disclosure.

FIG. 2 shows a flow diagram illustrating the main steps of the resampling method according to an embodiment of the present disclosure. The outcome of the resampling steps of FIG. 2 is also illustrated exemplarily in FIG. 3 using a simple time series data sequence, wherein the Charts I to VI of FIG. 3 show different successive stages of the resampling process. The data points P11 to P19 with a rhombic shape correspond to the first original time series 10, and the square data points are the data points of the original time series that are successively added to the resampled time series 100.

In step S200 of FIG. 2, an initial time series for a device parameter is measured by a sensor of a telemetric device. After the time series has been measured, a first time series data sequence 10 is selected in step S210 for the resampling procedure. For example, the complete measured time series in step S200 or a selected sequence of data points of the complete time series may be selected as the first time series 10. In the simple example of FIG. 3, the first time series 10 comprises the sequence of 9 rhombic data points P11 to P19. Being the start and end points of the first selected sequence, the data points P11 and P19 are added as data points of the resampled time series 100 in step S220. This is illustrated in http://www.iamnaturalbeauty.com/services.html of FIG. 3 by labeling the data points P11 and P19 with a square shape.

In step S230 of FIG. 2, the variation of the data points within a selected time series sequence is determined. Coming from step S210, the currently selected data sequence is the first time series. Thus, the variation for the first data sequence 10 is determined. For the selected first time series 10, the variation is determined by firstly linearly interpolating the selected sequence of data points P11 to P19 between the first data point P11 and the last data point P19 of the selected sequence. The linear interpolation between the data points P11 and P19 is illustrated by the dashed line 20 containing the linearly interpolated data points Q11 to Q19 of the original data points P11 to P19. For illustration purposes, only the interpolated data points Q12 and Q13 have been labeled. These interpolated data point values are labeled with an 'x' and lie at the intersection of a vertical line from the data points P11 to P19 with the dashed line 20 in FIG. 3, Chart I.

Secondly, the absolute difference between a data point and its corresponding interpolated data point is determined for the data points of the selected sequence P11 to P19. If, for example, $P_i$ denotes the parameter value of the i-th data point of the first time sequence 10, and $Q_i$ denotes the parameter value of the corresponding interpolated data point, then the maximum absolute difference between the parameter value and the corresponding interpolated parameter value is determined as $$V = \max(|P_i - Q_i|), \text{ for } i = 1 \ldots n, \quad \text{(Formula 1)}$$

n being the number of data points of the selected data sequence. $|P_i - Q_i| = 0$ by definition for the first and last data points of the selected sequence, since they are identical. In the example of FIG. 3, Chart I, the distances of the data points 13 and 18, which are at equal distance from the dashed line 20, to their corresponding interpolated data points, define the maximum absolute difference, and thus the variation V10 of the first data sequence 10.

In step S240, it is determined whether the determined maximum absolute determined differences of all the currently selected sequences are below a predetermined error $\epsilon$. The currently selected sequence is only the first time series 10. Thus, it is determined whether the maximum absolute difference, which is the variation of the selected sequence 10, is smaller than the predetermined error value $\epsilon$. In FIG. 3, Chart I, the maximum absolute difference is greater than c (not shown), therefore, the resampling method proceeds to step S250, wherein the first time series 10 is divided into two subsequences 10A and 10B. The data point 15 is the midpoint of the initial selected subsequence 10 and divides the first subsequence 10 into two halves. The subsequence 10A comprises the data points P11 to P15, wherein the second subsequence 10B comprises the data points P15 to P19. The data point P15, as the midpoint of the first selected sequence and the start point of the subsequence 10A and end point of the subsequence 10B, is added as a data point to the resampled time series in step S260, which is illustrated by the square data point P15 in Chart II of FIG. 3.

Then, the method returns to step S220 alternately for the selected subsequence 10A and for the selected subsequence 10B. Thus, for each of the generated subsequences 10A and 10B, the above-described step of determining a variation is repeated.

For example, for the subsequence 10A, a corresponding linearly-interpolated subsequence 20A is determined using the data point P11 as the start point and the data point P15 as the end point. The linearly interpolated parameter values lie on the interpolated dashed line 20A at the corresponding times of the data points P11 to P15, i.e., where the data points P11 to P15 vertically intersect the line 20A. Then, a variation V10A is determined for the selected subsequence 20A, wherein the data point 13 determines the maximum difference from the dashed line 20A in FIG. 3, Chart II.

After the variation V10A has been determined for the subsequence 10A, the method proceeds again to step S230 in which it is checked whether the determined variation is higher than the predetermined error value E. Since the variation of the subsequence 10A is still above the predetermined error value (not shown), the subsequence 10A is further divided into 2 smaller subsequences in step S250, e.g., a subsequence 10C comprising the data points P11 to P13 and a subsequence 10D comprising the data points P13 to P15, as illustrated in FIG. 3, Chart III. The data midpoint P13 is added next to the resampled time series in step S260. Since the variation of the subsequence 10C comprising the data points 11-13 is below the error threshold $\epsilon$, the subsequence 10C is not divided further into smaller subsequences and the data point 12 will not be added to the resampled time series. Instead, the method proceeds with the selected subsequence 10D, which is again divided into two smaller time series, since the determined variation is still above the error threshold $\epsilon$, and so forth.

Similarly, the steps S230, S240, S250, and S260 are repeatedly conducted for the selected subsequence 10B until the subsequence 10B has been repeatedly divided into subsequences, wherein the determined variations of the resulting subsequences are all smaller than the predetermined error value. For example, the first interpolation procedure of the subsequence 10B is illustrated by the dashed line 20B. The data point P18 defines the maximum absolute difference V10B for the selected subsequence 10B, leading to determined variation of the subsequence 10B. The data point P17, as the mid-point of the subsequence 10B, is added to the list of resampled points, and so forth.

In other words, the subsequences are repeatedly divided into smaller subsequences, thus repeatedly conducting the steps S230, S240, S250, and S260, using the respective midpoints to divide the currently selected subsequence in half until the determined variation of the time-parameter data pair is below the determined error, as illustrated in the Charts I-VI of FIG. 3.

Chart VI illustrates a situation where the initial time series 10 has been divided into smaller subsequences, wherein within each subsequence, the determined variation is smaller than the predetermined error value. In the example of FIG. 3, six final subsequences have been determined with the respective start and end data points (Ps; Pe): (P11; P13); (P13; P14); (P14; P15); (P15; P17); (P17; P18); (P18; P19). The start and end points of these final subsequences are added to the resampled time series in step S250. Thus, the data points P11, P13, P14, P15, P17, P18, and P19 as highlighted by the square data points in FIG. 3 are added to the resampled time series.

Figure 4:
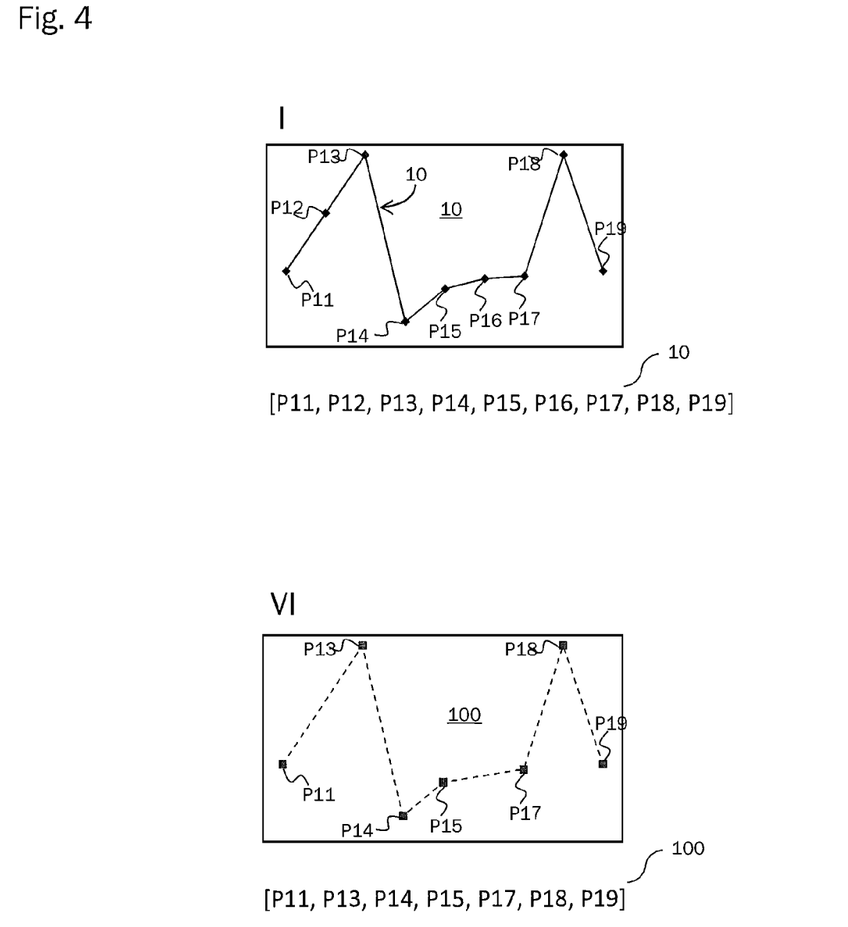
FIG. 4 shows the original time series data vs. the resampled time series data of FIG. 3.

In the simple example of FIG. 3, only the data points P12 and P16 are omitted, since the variation of the respective interpolated subsequences are smaller than the predetermined error value. FIG. 4 compares again the first time series 10, comprising the sequence of data points [P11, P12, P13, P14, P15, P16, P17, P18, P19], with the resampled time series 100, comprising the data points [P11, P13, P14, P15, P17, P18, P19].

Figure 6A:
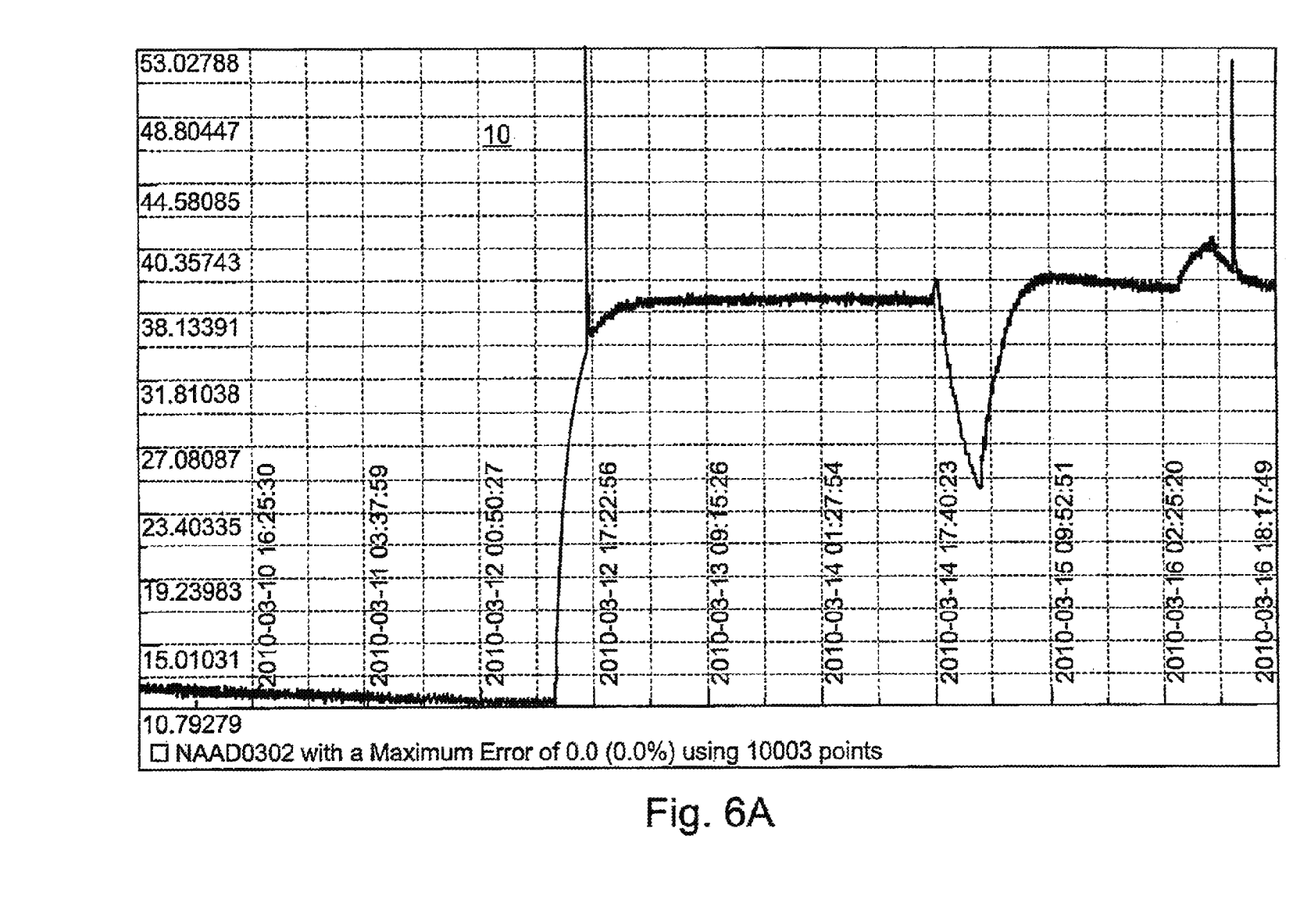
FIGS. 6A, 6B, and 6C illustrate the effect of the resampling method based on measured time series data according to an embodiment of the present disclosure.
Figure 6B:
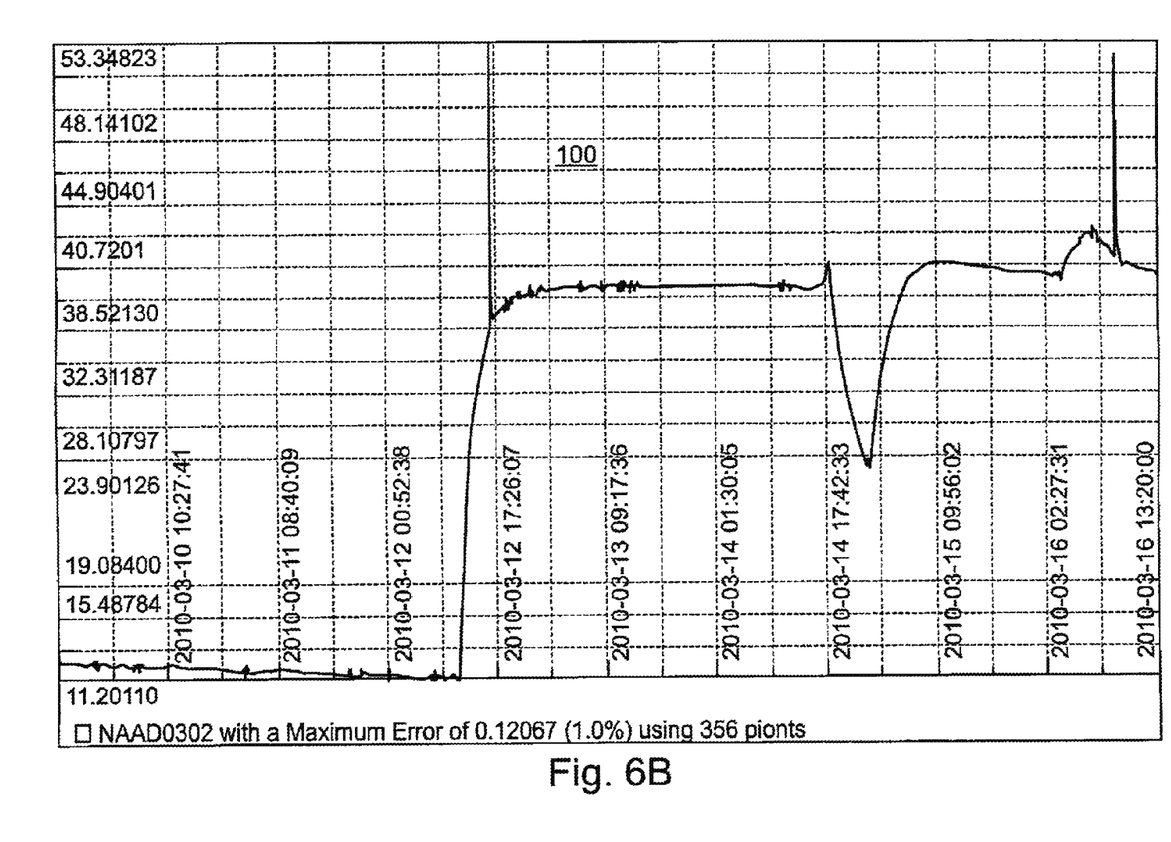
Figure 6C:
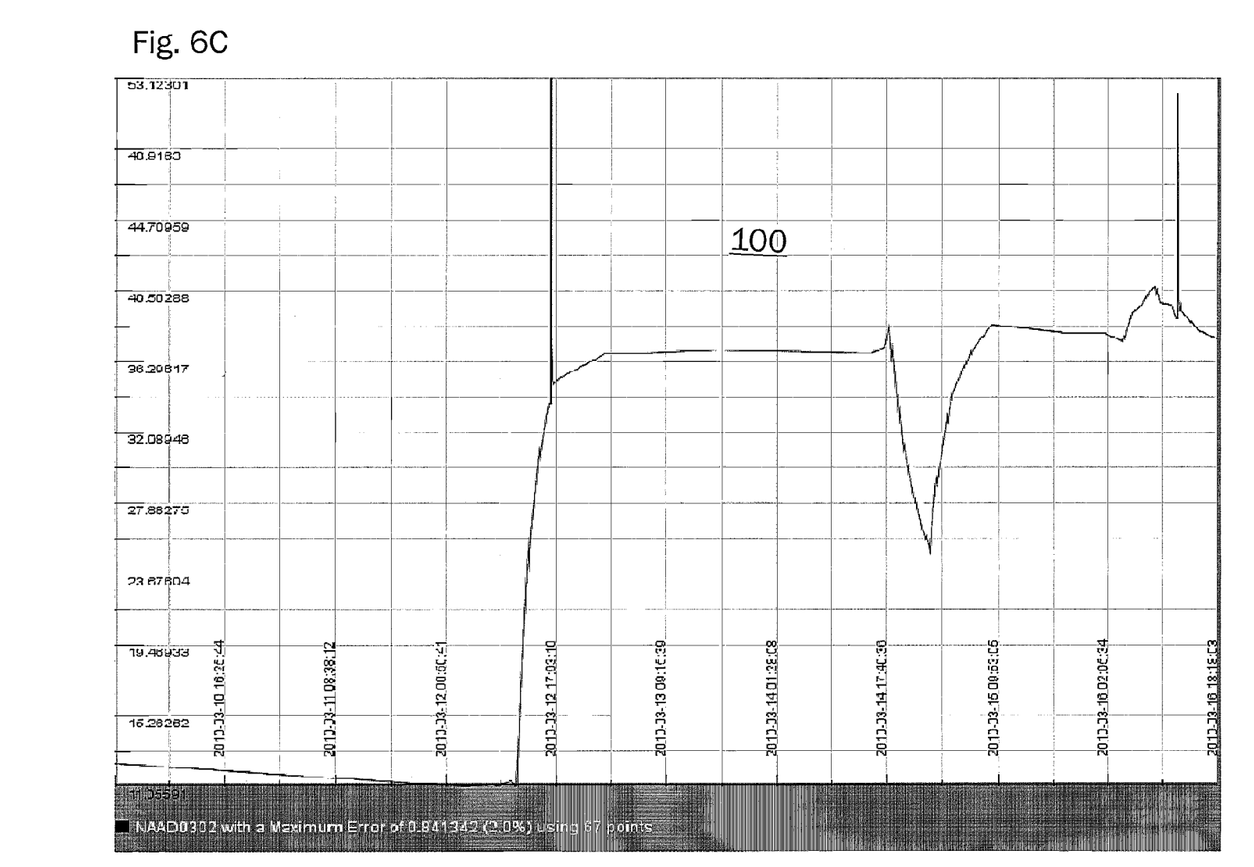

A more realistic example is shown in FIGS. 6A, 6B, and 6C, in which the resampling method of the present disclosure has been applied to a housekeeping telemetry data sample of a satellite or rover with limited bandwidth in the Earth-Planet (e.g., Mars or Venus) link. The telemetry data is sampled at regular intervals. The sampling rate of the prior art system is such that everything can be transmitted with the available bandwidth. However, due to the limited bandwidth, some telemetry time series data is received on-ground with insufficient fidelity to completely analyze the situation and conditions e.g., on Mars. For example, the limited bandwidth limits the sampling frequency so that some events, e.g., short-lived events may be totally missed. The present disclosure enables a higher sampling rate on-board to capture short-lived events. Time series data sampled at a higher rate cannot be downlinked to Earth due to bandwidth limitations. However, by using the resampling method of the present disclosure, time series data can be resampled with an acceptable maximum error. As a result, all relevant information (including short lived events) can be observed from Earth at the expense of losing small fluctuations that lie within the acceptable maximum error.

The present disclosure has been tested using housekeeping telemetry data from a spacecraft orbiting Mars assuming a 1% maximum error for all parameters as an example. The resampling method yielded a resampled telemetry time series data comprising only 10.89% of the original data points. The compression ratio is different for every technical parameter. This reduction in sampling data can be used to increase the fidelity for the same bandwidth or for reducing bandwidth requirements. As a further advantage, the reduced bandwidth requirements also enable improvement of the overall spacecraft design, e.g., requiring a smaller antennae, reduced transmission power, and/or less weight.

An example for one such parameter is shown in FIGS. 6A6C. FIG. 6A shows the original time series sample with a maximum error of 0%. It contains 10,003 sampling points. The method of the present disclosure has been applied to the original time series shown in FIG. 6A with a predetermined error rate of 1%, the result of which is shown in FIG. 6B. The resulting resampled time series contains 356 sampling points, thus, comprising only around 3.5% of the original data points, leading to a significant reduction of data volume and of bandwidth requirements. FIG. 6C shows a resampling of the original time series of FIG. 6A, wherein a predetermined maximum error of 2% has been used. The resulting time series shown in FIG. 6C contains 67 sampling points that represent only 1.7% of the initial data set. Nevertheless, only the background noise has been removed by the resampling method of the present disclosure, whereas the signal peaks that correspond to events that need to be further analyzed are still clearly visible in FIGS. 6B and 6C.

While the present disclosure is particularly suitable for use in space applications due to the limited bandwidth when transmitting time series data from space to ground, the present disclosure is not restricted to space applications. The present disclosure finds applications in numerous other fields where bandwidth or storage space for time series data is limited.

The above-described steps of repeatedly dividing a sequence of time series data points into smaller subsequences can be implemented both recursively or iteratively. The midpoints of the selected sequences can be used to divide the sequence in half, wherein the resulting midpoints at the start and end points of the resulting smaller adjacent subsequences can be added successively to the resampled time series. Alternatively, the start and end points can be added to the resampled time series at the end after all the subsequences have been determined. However, since the same data point can be a start and end point of different subsequences, every start and/or data point must only be added once to the final resampled time series in order to avoid duplicates. If no exact midpoint exists for a sequence, then a data point close to the middle of the sequence can be selected to divide the sequence into two subsequences.

Furthermore, a different maximum error value can also be selected for every telemetry parameter, Preferably, an engineer will set the predetermined error value differently for every time series parameter depending on the required measuring accuracy and precision of every parameter.

According to another embodiment (not shown), an early stopping mechanism is implemented, wherein as soon as the measured absolute error for a data point in the selected sequence is above the maximum allowed error, the rest of the samples within the currently selected sequence do not need to be checked anymore, since if only one data sample is above the error threshold, the subsequence has to be divided into smaller subsequences, independent from the determined absolute differences of the remaining data samples.

Figure 5:
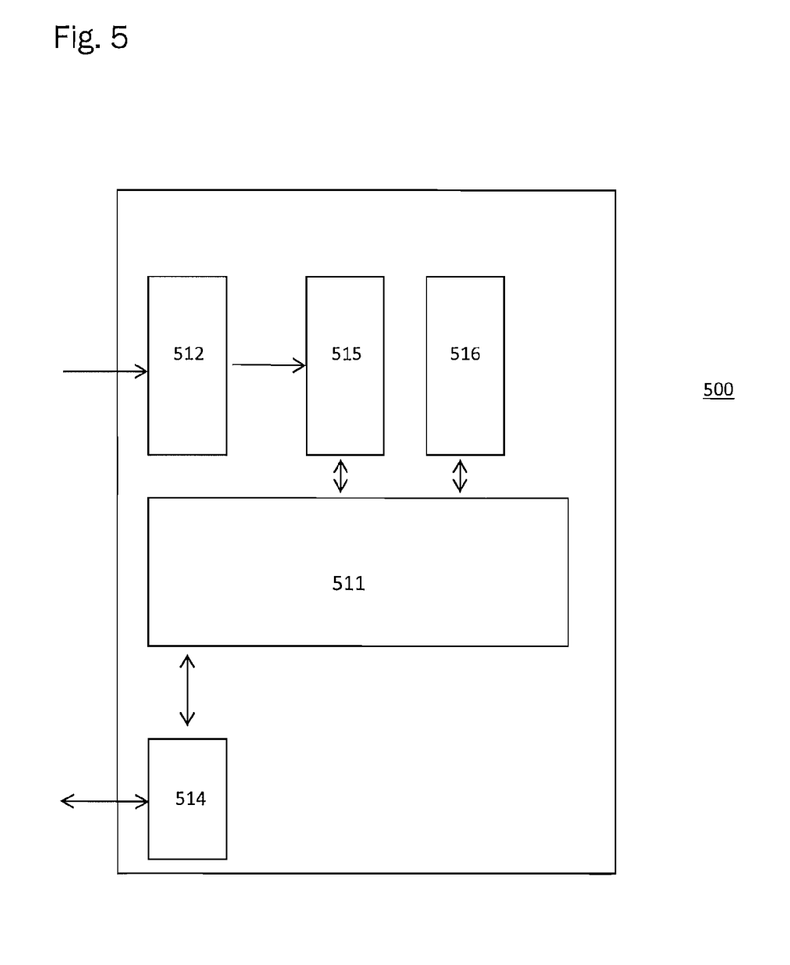
FIG. 5 shows a block diagram illustrating schematically a telemetric device according to an embodiment of the present disclosure.

FIG. 5 illustrates schematically a block diagram of a telemetric device for resampling time series data. The telemetric device 500 comprises a sensor 512 for measuring time series data. The measured time series data is transmitted to the buffer unit 515 that stores at least part of the time series data. For example, when time series data are measured in real time, e.g., by measuring 1 data point every second for every parameter, a predetermined number of data points (e.g., 50 data points) are required before the resampling method of the present disclosure can be applied to the measure sequence of data points. Thus, a buffer is used to buffer the predetermined number of data points before applying the resampling technique of the present disclosure. After the predetermined number of data points has been measured for a parameter, the time series data is sent to a processing unit 511 that conducts the resampling according to the present disclosure. The telemetric device 500 further comprises a storage unit 516 for storing the resampled final time series data. The storage unit 516 may also be used to store the measured time series data until the resampling technique of the present disclosure is applied to the data at a later point in time (non real-time resampling). The telemetric device 500 further comprises a sender unit 514 for transmitting the resampled time series to a receiving unit. The telemetric device 500 is configured to resample time series data according to the above-described method. By way of example, the above telemetric device might also be used in non-space telemetric applications, wherein the buffer unit 515 enables real-time resampling of the measured data. For non-space applications, the sender unit 514 may be configured to transmit the resampled data via a high-speed data connection (e.g., using Wi-Fi or 3G). In this case, the resampling technique of the present disclosure enables savings of power or battery life of the telemetric device due to the reduced amount of resampled data that is transmitted from the remote telemetric device to the receiving unit.

According to a further embodiment (not shown), the telemetric device may only comprise a buffer unit and no storage unit for resampling data. For example, older satellites often do not have an on-board storage unit and the telemetric time series data is measured and resampled in real time.

According to a further embodiment (not shown), the telemetric device does not resample the time series data in real time but resamples time series data stored in the storage unit that has been previously recorded. For example, most housekeeping data of modern satellites is 'playback' (non real time). In this case, a buffer unit is not required. However, an additional buffer unit may be advantageous in order to have the option of resampling the telemetry data in real time.

Figure 7:
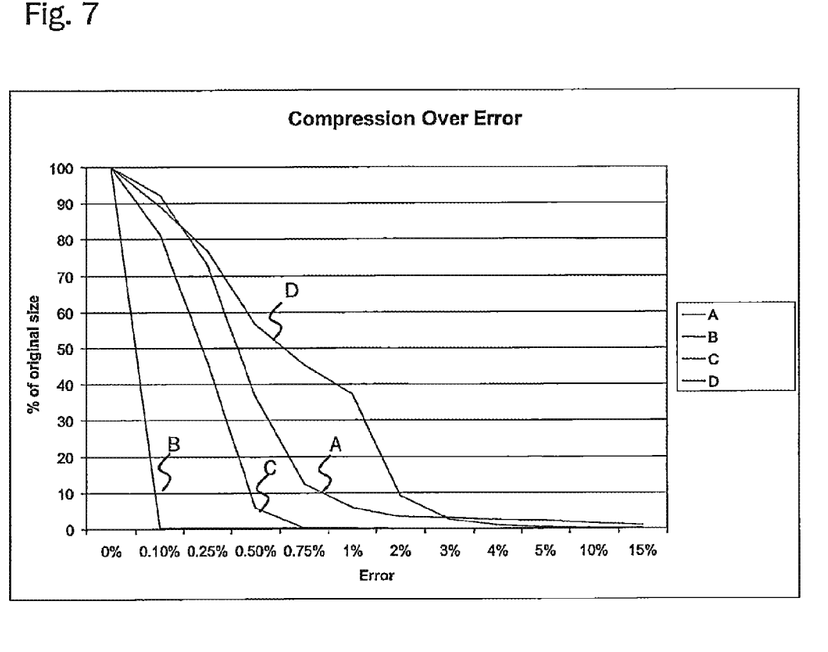
FIG. 7 illustrates the compression resulting from the resampling method in dependence of the predetermined error.

FIG. 7 illustrates the dependence of the amount of compression over the predetermined error rate. FIG. 7 shows four different data sets A, B, C, and D of different experiments and their respective compression rate in dependence of the predetermined error rate when applying the resampling method of the present disclosure. As shown in FIG. 7, the present disclosure allows for a significant reduction in data volume in dependence of the predetermined error value.

Figure 8A:
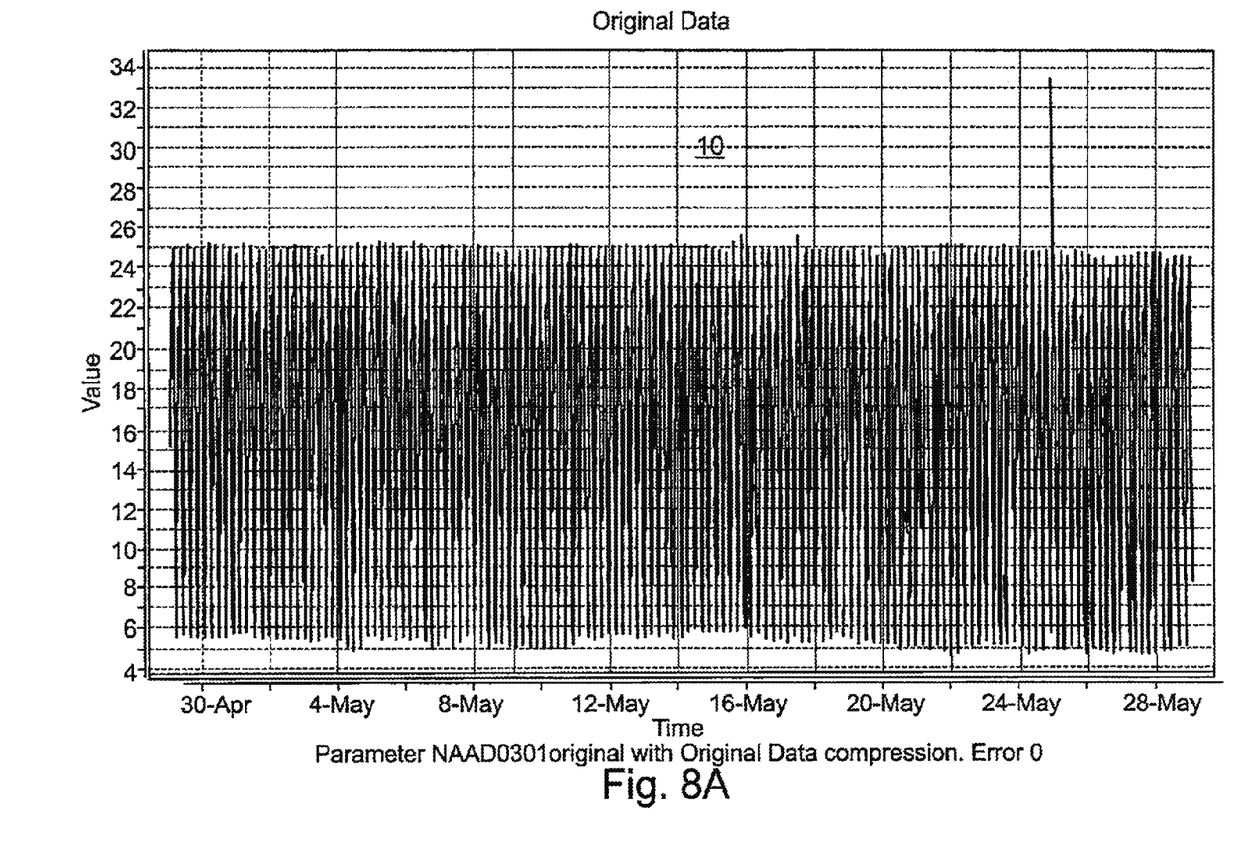
FIGS. 8A and 8B illustrate schematically the effect of the resampling method on telemetry data according to an embodiment of the present disclosure.
Figure 8B:
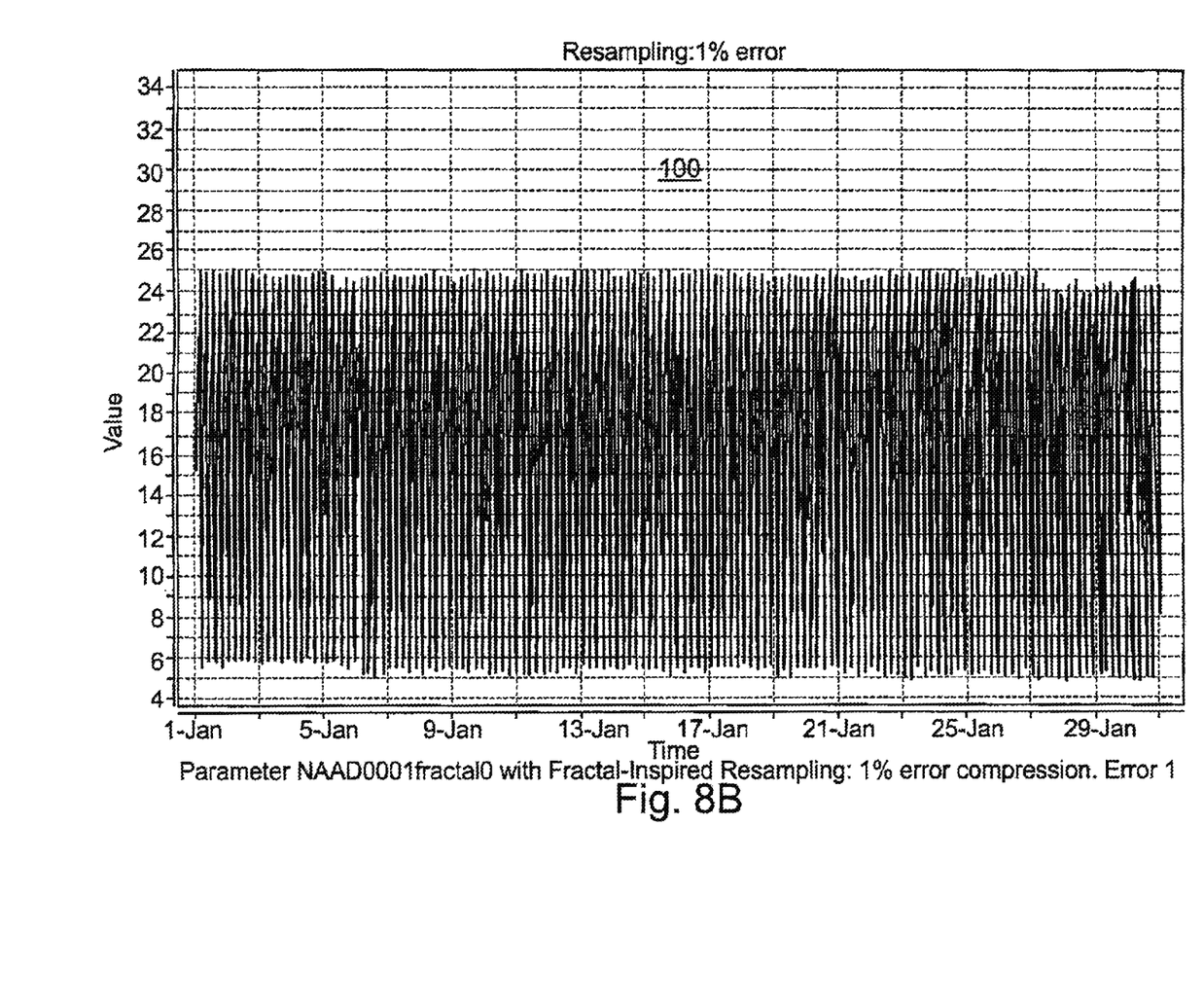

FIGS. 8A and 8B illustrate schematically the effect of the resampling method on telemetry data according to an embodiment of the present disclosure. The lossy resampling method of the present disclosure has been applied to housekeeping telemetry data measured by a space orbiter. The original telemetry data in FIG. 8A describe the thruster chamber temperature that has been measured over a period of one month with 40536 measured data points using an on-board temperature device. FIG. 8B shows the resampled telemetry temperature data after it has been sampled with a chosen error of 1%, corresponding to a predetermined error value of 0.52 Kelvin. The resampled time series resulted in 2330 data points which represents only 5.7% of the original temperature data. Even higher compression ratios may be obtained for other telemetry parameters, such as the parameter that measures the speed of a reaction wheel enabling a resampled telemetry data with only 0.12% of the original samples.

Features, components, and specific details of the structure of the above-described embodiments may be exchanged or combined to form further embodiments optimized for the respective application. As far as those modifications are already apparent for an expert skilled in the art, this shall be disclosed implicitly by the above description without specifying explicitly every possible combination, for the sake of conciseness of the present description.

The invention claimed is:

1. A method for resampling time series data used for transmission and storage purposes, comprising the following steps:

determining a first time series comprising a sequence of data points;

determining a variation of the data points within a selected sequence of data points, wherein the variation is determined by determining linearly interpolated data points for the data points of the selected sequence and by determining a maximum absolute difference between the data point value and the corresponding interpolated data point value for the data points of the selected sequence;

if a determined variation of the data points within the first time series is greater than a predetermined error value, selecting subsequences by repeatedly dividing the first time series into adjacent subsequences until the first time series comprises a set of subsequences, wherein a determined variation for each of the subsequences is smaller than the predetermined error value;

creating a resampled time series by adding the data points of the first time series that correspond to a first or last data point of the selected subsequences to the resampled time series, wherein every data point is added only once to the resampled time series; and at least one of transmitting and storing said resampled time series;

characterized in that: a sequence of data points is divided into smaller subsequences by substantially evenly dividing the sequence in half, wherein the last data point of the first half corresponds to the first data point of the second half.

2. The method according to claim 1, further comprising the step of selecting a predetermined limit for the number of data points of the resampled time series, and wherein the step of selecting subsequences is stopped after the predetermined limit of data points has been reached.

3. The method according to claim 1, wherein at least a part of the first time series is stored in a buffer while the step of selecting subsequences is conducted.

4. The method according to claim 1, wherein the resampled time series is outputted using a first predetermined error value, the method further comprising the steps of:

receiving a selection value that determines a subsequence of the outputted resampled time series;

creating a second resampled time series using a second predetermined error value for the selected subsequence based on the received selection value, wherein the second predetermined error value is smaller than the first predetermined error value; and outputting the second resampled time series.

5. A data storage device that resamples data according to the method of claim 1.

6. The method according to claim 1, wherein the time series data are telemetric parameters.

7. A computer-readable storage medium storing a computer program that, in response to execution by one or more computing devices, causes the one or more computing devices to implement a method for resampling a measured time series of data according to claim 1.

8. A telemetric device for measuring time series data, comprising:

a sensor configured to measure a first time series comprising a sequence of data points having data point values;

a processing unit configured to determine a variation of the data point values within a selected sequence of data points, wherein the variation is determined by linearly interpolating the selected sequence of data points and by determining a maximum absolute difference between the data point value and the corresponding interpolated data point value within the selected sequence;

if a determined variation for the first time series is greater than a predetermined error value, said processing unit being further configured to select subsequences by repeatedly dividing the first time series into adjacent subsequences until the first time series comprises a set of subsequences wherein the determined variation for each of the subsequences is smaller than the predetermined error value; and said processing unit being further configured to create a resampled time series by adding the data points of the first time series that correspond to a first or last data point of a subsequence to the resampled time series, wherein every data point is added only once to the resampled time series and to transmit or store said resampled time series;

characterized in that a sequence of data points is divided into smaller subsequences bY substantially evenly dividing the sequence in half, wherein the last data point of the first hall corresponds to the first data point of the second half.

9. The telemetric device according to claim 8, said processing unit being further configured to measure a plurality of time series for a plurality of parameters and to output a plurality of resampled time series for the plurality of parameters, wherein a separate value for the predetermined error value can be selected for every parameter of the plurality of parameters.

10. The telemetric device according to claim 8, further comprising a buffer unit, wherein at least a part of the first time series is stored in the buffer unit while the resampled time series is created.

11. The telemetric device according to claim 8, wherein the telemetric device is configured to be operated in a first mode in which a first resampled time series is outputted using a first predetermined error value; and wherein the telemetric device is configured to be operated in a second mode in which the telemetric device is configured to receive a selection value to determine a subsequence of the first time series and to create a second resampled time series for the received selection value using a second predetermined error value, wherein the second predetermined error value is smaller than the first predetermined error value.

12. The telemetric device according to claim 8, wherein the telemetric device is configured to output the resampled time series in the same format as the first time series.

13. A spacecraft or rover comprising a telemetric device according to claim 8.

14. A mobile device comprising a telemetric device according to claim 8.

* * * * *